US009488444B2

(12) United States Patent
Streuber et al.

(10) Patent No.: US 9,488,444 B2
(45) Date of Patent: Nov. 8, 2016

(54) TIME-MULTIPLEXED BROADBAND AND MULTI-FILTERED ELECTRO-OPTIC SENSOR

(71) Applicant: Raytheon Company, Waltham, MA (US)

(72) Inventors: Casey T. Streuber, Tucson, AZ (US); Michael P. Easton, Tucson, AZ (US); Kent P. Pflibsen, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 780 days.

(21) Appl. No.: 13/872,617

(22) Filed: Apr. 29, 2013

(65) Prior Publication Data

US 2014/0320843 A1  Oct. 30, 2014

(51) Int. Cl.
| | |
|---|---|
| *G01C 3/08* | (2006.01) |
| *F41G 7/00* | (2006.01) |
| *F41G 7/22* | (2006.01) |
| *G01S 3/784* | (2006.01) |
| *G02B 26/08* | (2006.01) |
| *G02B 26/10* | (2006.01) |
| *G02B 27/10* | (2006.01) |

(52) U.S. Cl.
CPC ............. *F41G 7/008* (2013.01); *F41G 7/2253* (2013.01); *F41G 7/2293* (2013.01); *G01S 3/784* (2013.01); *G02B 26/0875* (2013.01); *G02B 26/10* (2013.01); *G02B 27/1013* (2013.01)

(58) Field of Classification Search
CPC .... F41G 7/008; F41G 7/2253; F41G 7/2293; G01S 3/784; G02B 26/0875; G02B 26/10; G02B 27/1013
See application file for complete search history.

(56) References Cited

U.S. PATENT DOCUMENTS

| | | |
|---|---|---|
| 7,542,090 B1 | 6/2009 | Merchant |
| 2002/0167655 A1 | 11/2002 | Friedman |
| 2005/0030550 A1* | 2/2005 | Nahum .............. G01B 9/02004 356/521 |

(Continued)

FOREIGN PATENT DOCUMENTS

WO    9504299 A1    2/1995

OTHER PUBLICATIONS

McManamon et al., "Optical Phased Array Technology," Proceedings of the IEEE, vol. 84, No. 2, Feb. 1996, pp. 268-298.

(Continued)

*Primary Examiner* — Luke Ratcliffe
*Assistant Examiner* — Samantha K Abraham
(74) *Attorney, Agent, or Firm* — Eric A. Gifford

(57) ABSTRACT

An EO sensor is configured to time multiplex a primary optical channel that provides high detection sensitivity to maintain high SNR and a multi-filtered optical channel that provides detection in different measurement bands (e.g. spectral, polarization, amplitude or phase). The channels may, for example, be time multiplexed based on range to target or within each integration period of the EO sensor. The multi-filtered optical channel uses a field directing array to sample the FOV to form different optical sub-channels that are filtered by different optical filters. These sub-channels may be spatially multiplexed onto different sub-regions of the detector or may be time multiplexed onto the entire detector. The light modulator used to time multiplex the primary and multi-filtered optical channels may be used to time de-multiplex spatially overlapping regions of the FOV onto a pixel of the detector in order to detect high spatial resolution images with low resolution detectors.

20 Claims, 8 Drawing Sheets

(56) References Cited

U.S. PATENT DOCUMENTS

| | | | |
|---|---|---|---|
| 2006/0198454 A1* | 9/2006 | Chung | H04L 25/0202 375/260 |
| 2008/0220736 A1* | 9/2008 | Yeh | G01S 19/29 455/296 |
| 2011/0300490 A1* | 12/2011 | Rachet | G02B 21/0032 430/322 |
| 2012/0038786 A1 | 2/2012 | Kelly | |
| 2013/0088633 A1 | 4/2013 | Williams | |

OTHER PUBLICATIONS

Duarte et al.,"Single-Pixel Imaging via Compressive Sampling," IEEE Signal Processing Magazine [83] Mar. 2008.

Fan et al., "Switchable Fresnel lens using polymer-stabilized liquid crystals," Nov. 17, 2003, vol. 11, No. 23, Optics Express 3080.

Lavigne et al., "Target discrimination of man-made objects using passive polarimetric signatures acquired in the visible and infrared spectral bands," Proc. of SPIE vol. 8160, 816007, 2011.

* cited by examiner

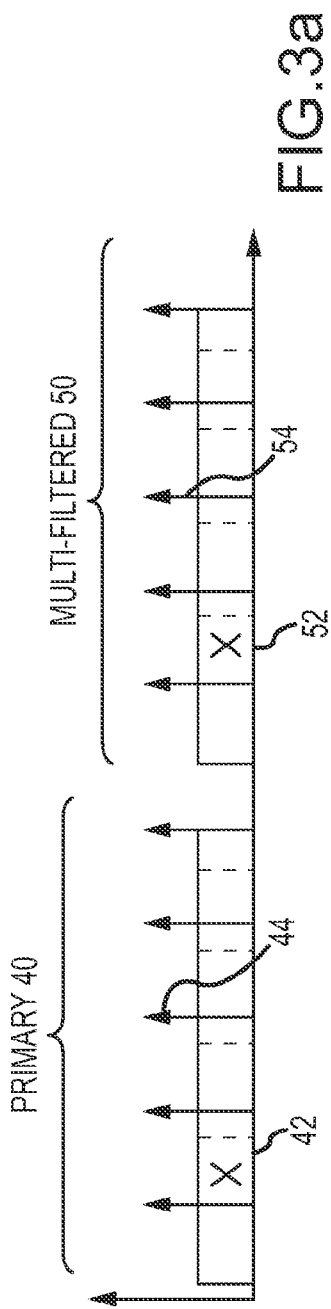
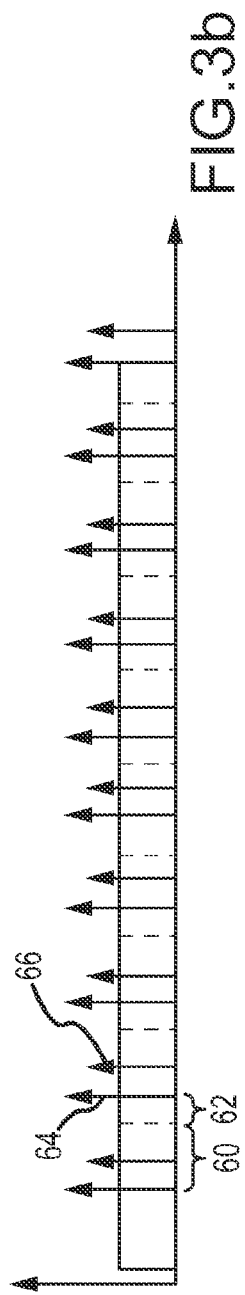
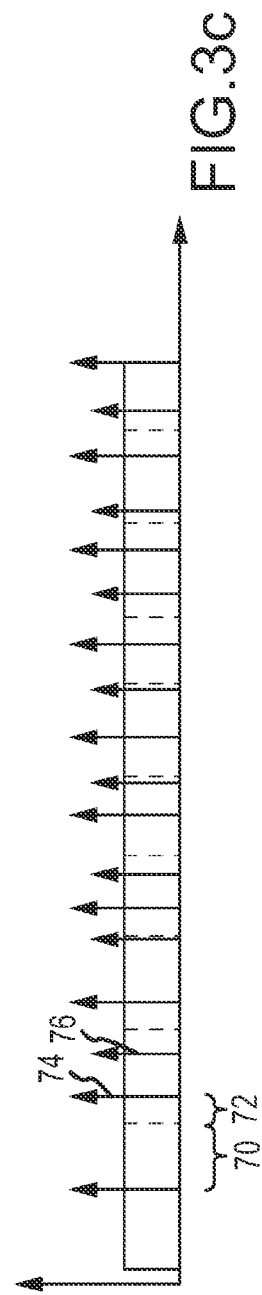
FIG. 3a
FIG. 3b
FIG. 3c

TIME-MULTIPLEXED BROADBAND AND MULTI-FILTERED ELECTRO-OPTIC SENSOR

BACKGROUND OF THE INVENTION

1. Field of the Invention

This invention relates to electro-optic (EO) sensors configured to detect both broadband and multi-filtered signatures. These EO sensors may be used in guided munitions and surveillance systems among other applications.

2. Description of the Related Art

Many guided munitions (e.g. self-propelled missiles, rockets, gun-launched projectiles or aerial bombs) use an EO sensor to detect and guide the munition to its target. The sensor's ability to detect and initiate target tracking at long standoff ranges to the target is critical. To accomplish this, the sensor must maintain a minimum signal-to-noise ratio (SNR) from the target signature.

In a semi-active laser (SAL) mode, the sensor detects active guidance radiation in the form of laser radiation from a SAL designator that is reflected off of the target and locks onto the laser spot to provide line-of-sight (LOS) error estimates at an update rate required by the guidance system. The standard SAL laser designator produces laser radiation at 1.064 microns in the Near IR. The optics spatially encode an angle of incidence of the SAL laser radiation (e.g. a laser spot) at an entrance pupil onto the SAL, detector. A quad-cell photodiode provides sufficient resolution to determine the LOS error estimate.

In a passive imaging mode, the sensor detects IR radiation emitted from or reflected off of the target. The sources of IR energy are not artificial; they typically follow the laws of Planck radiation. The source may be the blackbody radiation emitted by the target directly or may, for example, be sunlight that is reflected off of the target. The passive imaging radiation from a typical target is at long range such that the electromagnetic wavefront at the sensor is considered to be composed of planar wavefronts. The structure of the target is imprinted on the composite wavefront as a summation of planar wavefronts with different slopes. The optics convert these slopes to spatial offsets in the image plane to form an image of the target on the pixelated IR imaging detector.

The IR imaging detector typically operates in the Short-Wave Infrared (SWIR) (1-2.5 um), Mid-Wave Infrared (MWIR) (3-5 um), or Long-Wave Infrared (LWIR) (8-14 um) electromagnetic radiation bands. With currently available technologies such as opto-mechanical scanning, staring focal plane array (FPA) or digital scanning (known as a "Rice pixel"), this detector may exhibit an effective spatial resolution, for example, of anywhere from 32×32 to 4,000× 3,000 pixels. Selection of the desired band(s) for the passive imaging sensor depends on the target of interest and the expected atmospheric absorption bands. The SWIR Band is typically used in night conditions to provide high contrast. The MWIR band is selected if the expected targets are relatively hot (e.g. planes, missiles, etc.). The LWIR band is typically used to image targets that have operating temperatures slightly above the standard 300K background.

Some guided munitions use a "dual-mode" EO sensor that includes both a SAL mode and a passive imaging mode. The dual-mode EO sensor comprises a primary optical element having a common aperture for collecting and focusing SAL laser radiation and passive imaging radiation. A secondary optical element separates the SAL laser and passive imaging radiation by spectral band and directs the SAL laser radiation to a SAL detector and directs the passive imaging radiation to an IR imaging detector. The SAL mode is typically used early in flight to detect the target at a maximum standoff range. The passive imaging mode is typically used mid-flight or at the end of flight to process a more highly resolved image to determine whether or not the target is of interest or to choose a particular aimpoint on the target. The passive imaging mode operates at a much higher spatial resolution than the SAL mode. The passive imaging mode may be used to provide LOS error estimates to track the target when SAL designation is not available. However, due to its much higher spatial resolution, and detection of passive radiation, there are fewer incident photons per pixel, and the passive imaging mode may not have the sensitivity (i.e. SNR) to acquire and track the target at long ranges at the desired update rate.

Surveillance systems use EO to detect, identify and track targets of interest. These systems typically operate at shorter ranges to the target than the initial acquisition ranges associated with guided munitions and have enough physical space to include a larger aperture, and thus it is much easier to acquire and maintain a target signature with adequate SNR. However, surveillance systems may require more finely resolved target signatures to differentiate and identify targets. To accomplish this, the EO sensor may filter the incident radiation into multiple measurement bands to increase the dimensionality or diversity of the target signature. For example, the EO sensor may filter the radiation into multiple narrow or broad spectral bands. Alternately, the EO sensor may filter the radiation into its four polarization states to provide the Stokes vectors to determine the Degree of Linear Polarization, which is very useful in discriminating between natural and man-made targets. In one approach, the EO sensor cascades filtered beam splitters to split the incident radiation into the desired number of filtered sub-channels and directs the filtered light in each sub-channel to a different detector. The light may be filtered according to wavelength or polarization. The attenuation of the incident radiation incident on each detector, hence the reduction in SNR is considerable but tolerable in typical surveillance systems. In another approach, the EO sensor includes single pixel filters that are positioned pixel-by-pixel on the detector to sample the field-of-view (FOV). This approach reduces the amount of attenuation and shares a common detector but is time-consuming, costly and fragile.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an EO sensor with the requisite sensitivity and discrimination to detect targets at longer standoff ranges and to discriminate targets at closer standoff ranges.

In an embodiment, an EO sensor comprises an objective optical system that forms an image within a field of view (FOV) from incident optical radiation. A light modulator is configured to alternately direct the incident optical radiation in the FOV to a primary optical channel and to a multi-filtered optical channel to time multiplex the FOV. The primary optical channel comprises a relay optic configured to relay the image of the FOV onto a detector configured to convert optical radiation into a first electrical signal. The multi-filtered optical channel comprises a relay optic configured to relay the image of the FOV to a plane at or near the focal position of a focusing optic configured to substantially collimate the incident optical radiation in the FOV and a field directing array having a plurality of tilt cells configured to spatially sample the collimated optical radiation over the FOV. Each tilt cell comprises first and second optical tilt elements that tilt the sampled optical radiation by different first and second tilt angles, respectively, to map the sampled FOV to first and second spatially separated optical sub-channels. First and second optical filters having different measurement bands are positioned in the first and second optical sub-channels, respectively, to filter the optical radiation. One or more detectors convert the filtered optical radiation in the different measurement bands into a second electrical signal.

In an embodiment, the primary and multi-filtered channels are time multiplexed so that optical radiation is directed to the primary optical channel at relatively long ranges to a target and is directed to the multi-filtered channel at relatively short ranges to the target. Alternately, the primary and multi-filtered channels may be time multiplexed within each integration period of the EO sensor at the sensor update rate. For example, the primary channel may be assigned its normal maximum integration period to generate the electrical signal at the sensor update rate. The unused portion of the integration period can be assigned to the multi-filtered channel to generate the electrical signal at the sensor update rate albeit slightly delayed. Alternately, the portion of the integration period assigned to the primary and multi-filtered channels may vary with mission parameters. For example, the portion assigned to the primary channel may be set to ensure a minimum SNR of the detected signal in the primary channel. As the range between the EO sensor and the target is reduced, the portion of the integration period assigned to the primary channel may be reduced while maintaining the minimum SNR.

In an embodiment, the primary and multi-filtered channels are independent, each including its own optics and detector. In another embodiment, the primary and multi-filtered channels have independent optics but are "folded" to share the same detector. In another embodiment, the primary and multi-filter channels share the same optics and the same detector.

In an embodiment, the primary channel is unfiltered to detect a maximally broadband signal passed by the objective. In another embodiment, the primary channel includes a single filter to select a particular spectral band such as in the visible, UV or IR. In another embodiment, the primary channel is configured to receive laser radiation from a SAL designator reflected off of a target. The primary channel is suitably configured to minimize attenuation of the optical radiation in the band of interest.

In an embodiment, the multi-filtered channel samples the FOV and separates the collimated radiation into two or more optical sub-channels. The optical filters may comprise different spectral filters, different polarization filters, different amplitude filters or different phase filters. A single filter filters all of the collimated radiation for the sub-channel.

In an embodiment of the multi-filtered channel, the focusing optic may be a single bulk optical component that collimates the incident optical radiation in the FOV. In this case, the different tilt angles within a tilt cell will vary across the field directing array to compensate for the changing field angle of each chief ray captured by an individual field directing array. Alternately, the multi-filtered channel may comprise a lenslet array in which each lenslet locally collimates light for each optical tilt element, reducing the complexity of the field directing array. In this case, the different field angles within a tilt cell will be substantially uniform across the field directing array.

In an embodiment of the multi-filtered channel, the filtered optical radiation in each optical sub-channel is directed to a different sub-region of the detector. By spatially multiplexing the different sub-channels the electrical signals for those sub-channels can be read out simultaneously.

In another embodiment of the multi-filtered channel, the filtered optical radiation in each of the optical sub-channels is directed to the entire detector. To read out the second electrical signal for a particular sub-channel, the spatial light modulator must time multiplex the sub-channels. This requires a light modulator having addressable elements that are mapped to the individual optical tilt elements in the tilt cells of the field directing array. By time multiplexing the different sub-channels, each sub-channel can be mapped to the full resolution of the detector.

In another embodiment of the multi-filtered channel, a light modulator having addressable elements that can be mapped to individual optical tilt elements in the tilt cells may be configured to time de-multiplex different portions of the FOV that are spatially overlapped on the same detector pixel. The detector is configured to read out the electrical signals over an appropriate integration period to stitch together an image whose spatial resolution exceeds the resolution of the detector. This de-multiplexing may be applied to some, all or none of the sub-channels based on mission requirements for SNR or spatial resolution. In general, de-multiplexing allows the EO sensor to construct high-resolution images with less expensive lower resolution detectors.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 3a-3c are timing diagrams of different embodiments of time multiplexing the broadband and multi-filtered channels;

DETAILED DESCRIPTION OF THE INVENTION

The present invention provides an EO sensor with the sensitivity to detect targets at long standoff ranges and to discriminate targets at closer standoff ranges. This is accomplished by time multiplexing a primary optical channel that provides high detection sensitivity to maintain high SNR and a multi-filtered optical channel that provides detection in different measurement bands (e.g. spectral, polarization, amplitude or phase). The channels may, for example, be time multiplexed based on range-to-target or within each integration period of the EO sensor. The multi-filtered optical channel uses a field directing array to sample the FOV to form different optical sub-channels. A different optical filter filters each sub-channel. These sub-channels may be spatially multiplexed onto different sub-regions of the detector or may be time multiplexed onto the entire detector. The light modulator used to time multiplex the primary and multi-filtered optical channels may be used to time de-multiplex spatially overlapping regions of the FOV onto a pixel of the detector in order to detect high spatial resolution images with low resolution detectors, and possibly low to moderate resolution field directing arrays.

Figure 1:
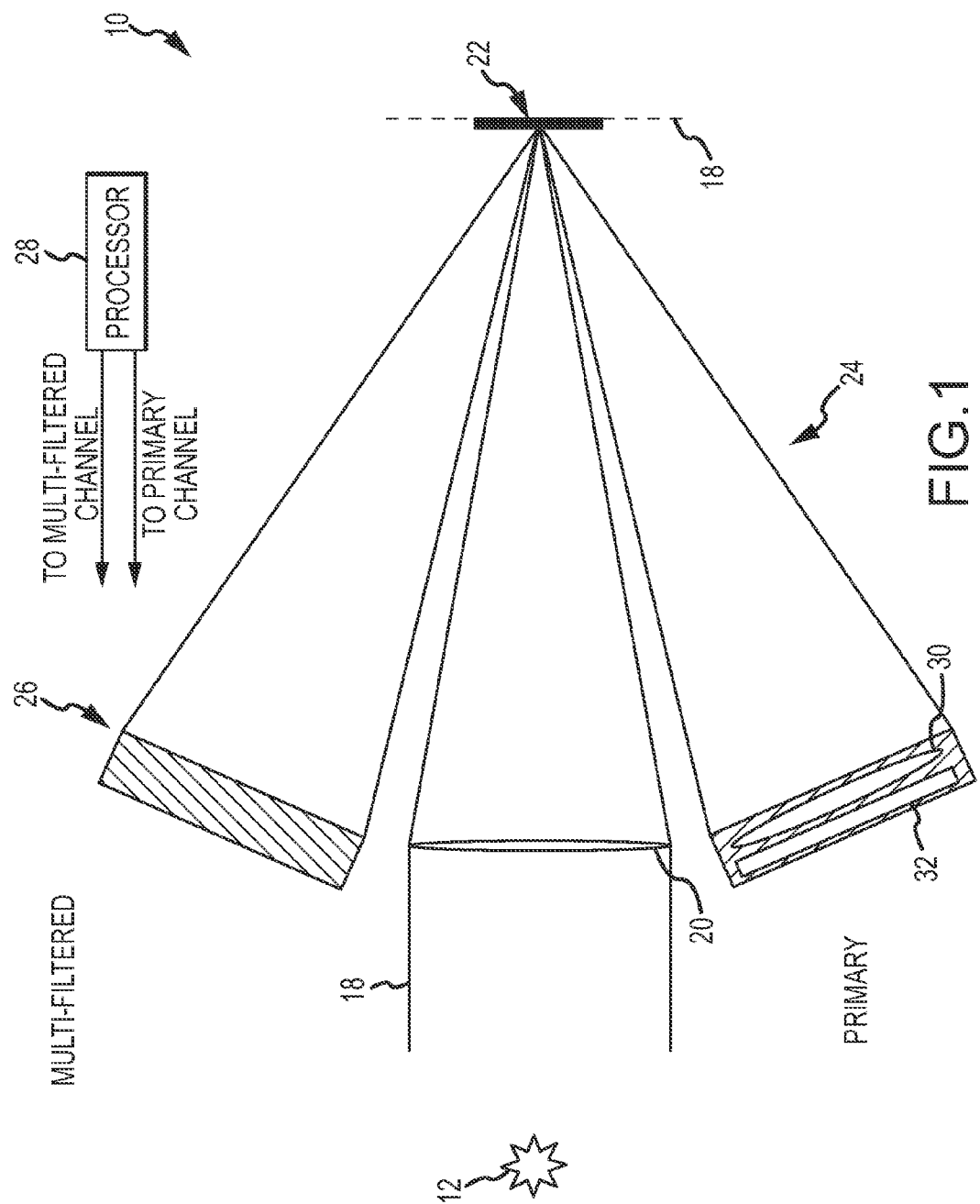
FIG. 1 is a diagram of an EO sensor having time-multiplexed broadband and multi-filtered optical imaging channels.

Referring now to the drawings, an embodiment of a an EO sensor 10 for acquiring, tracking and discriminating an object 12 denoted by a "star" within a sensor FOV is shown in FIG. 1. While object 12 is shown close to the entrance pupil of the EO sensor notionally, the object is typically at a very large distance from the entrance pupil of the EO sensor at least initially. Over this large distance the object optical radiation (e.g. UV, visible, NIR, SWIR, MWIR, LWIR) can be described as a collection of optical rays 16 with varying angles that depend on the type of emission/scatter from the object. However, again given the large distance, only a small selection of those rays that are grouped around an angle defined by the geometry of the object and the EO sensor enter the entrance pupil of the EO sensor. This angle is then transformed into a spatial offset to form an image at an image plane 18 via the objective optics 20. In this embodiment, the entrance pupil is defined by the objective optics. This transformation is due to the fundamental physics of imaging, which to first order follow an equation that states that the spatial offset at the focal plane of an optic is equal to the focal length of the optic multiplied by the tangent of the angle of incidence to the optic.

A light modulator 22 is positioned at or near image plane 18. The light modulator is configured to alternately direct the incident optical radiation in the FOV to a primary optical channel 24 and to a multi-filtered optical channel 26 to time multiplex the FOV. In an embodiment, light modulator 22 comprises a single element (e.g. an opto-mechanical steering mirror) to direct the optical radiation to either the primary or the multi-filtered optical channel. In another embodiment, light modulator 22 comprises an array of addressable elements to independently and selectively direct optical radiation within different portions of the FOV to one of the channels. The light modulator may comprise a transmissive device such as an addressable liquid crystal or a reflective device such as a digital micro-mirror device such as produced by Texas Instruments, Inc. A processor(s) 28 provides control signals to the light modulator 22 and its addressable elements to redirect the optical radiation between the primary optical channel 24 and the multi-filtered optical channel 26. As will be described in detail, this addressability provides additional capability to time multiplex optical sub-channels in the multi-filtered optical channel 26 or to time demultiplex portions of the FOV up to the limit of the modulator's native resolution that overlap on the same detector pixel.

In an embodiment, primary optical channel 24 comprises relay optics 30 that relay the image of the FOV at image plane 18 onto a detector 32 configured to convert optical radiation into a first electrical signal. Processor 28 suitably processes the first electrical signal to form digital images at a first update rate. The primary optical channel 24 may comprise other more complex optical systems to image the FOV on detector 32. As one example, the primary optical channel may be formed as described in co-pending application U.S. Ser. No. 13/768,778 entitled "Digitally Scanned Multi-Cell Electro-Optic Sensor" filed Feb. 15, 2013, which is hereby incorporated by reference.

In an embodiment, the primary optical channel 24 is unfiltered to detect a maximally broadband signal passed by the objective. In another embodiment, the primary optical channel includes a single filter to select a particular spectral band such as in the visible, UV or IR. In another embodiment, the primary optical channel is configured to receive laser radiation from a SAL designator reflected off of a target. The primary optical channel is suitably configured to minimize attenuation of the optical radiation in the band of interest. The primary optical channel is suitably used to detect and acquire a target at large ranges and to track the target as the range closes.

Depending on the architecture of the EO sensor (e.g. independent, folded or shared optical channels) and the light modulator technology (e.g. transmissive or reflective), the primary optical channel may also comprise an additional switch to block light from being unintentionally routed through the primary optical channel back to the detector for the multi-filtered optical channel. For example, an addressable reflective light modulator such as Texas Instruments digital micro-mirror in a folded architecture would direct light from unselected portions of the FOV for the multi-filtered channel through the primary channel and fold the light back onto the detector. The additional switch could prevent this by only passing light through the primary optical channel when that channel is selected.

In an embodiment, multi-filtered optical channel 26 uses optical tilt elements to sample the FOV and direct the optical radiation to different optical sub-channels, filters each channel with a different measurement band (e.g. spectral, polarization, amplitude or phase) and detects the filtered optical radiation to form a second electrical signal. The optical tilt elements may be fixed or reconfigurable. The sub-channels may be spatially multiplexed onto different sub-regions of the detector or may be time multiplexed onto the entire detector. The light modulator used to time multiplex the primary and multi-filtered optical channels may be used to time de-multiplex spatially overlapping regions of the FOV onto a pixel of the detector in order to detect high spatial resolution images with low resolution detectors. Processor 28 suitably processes the second electrical signal to form digital images at a second update rate.

Figure 2:
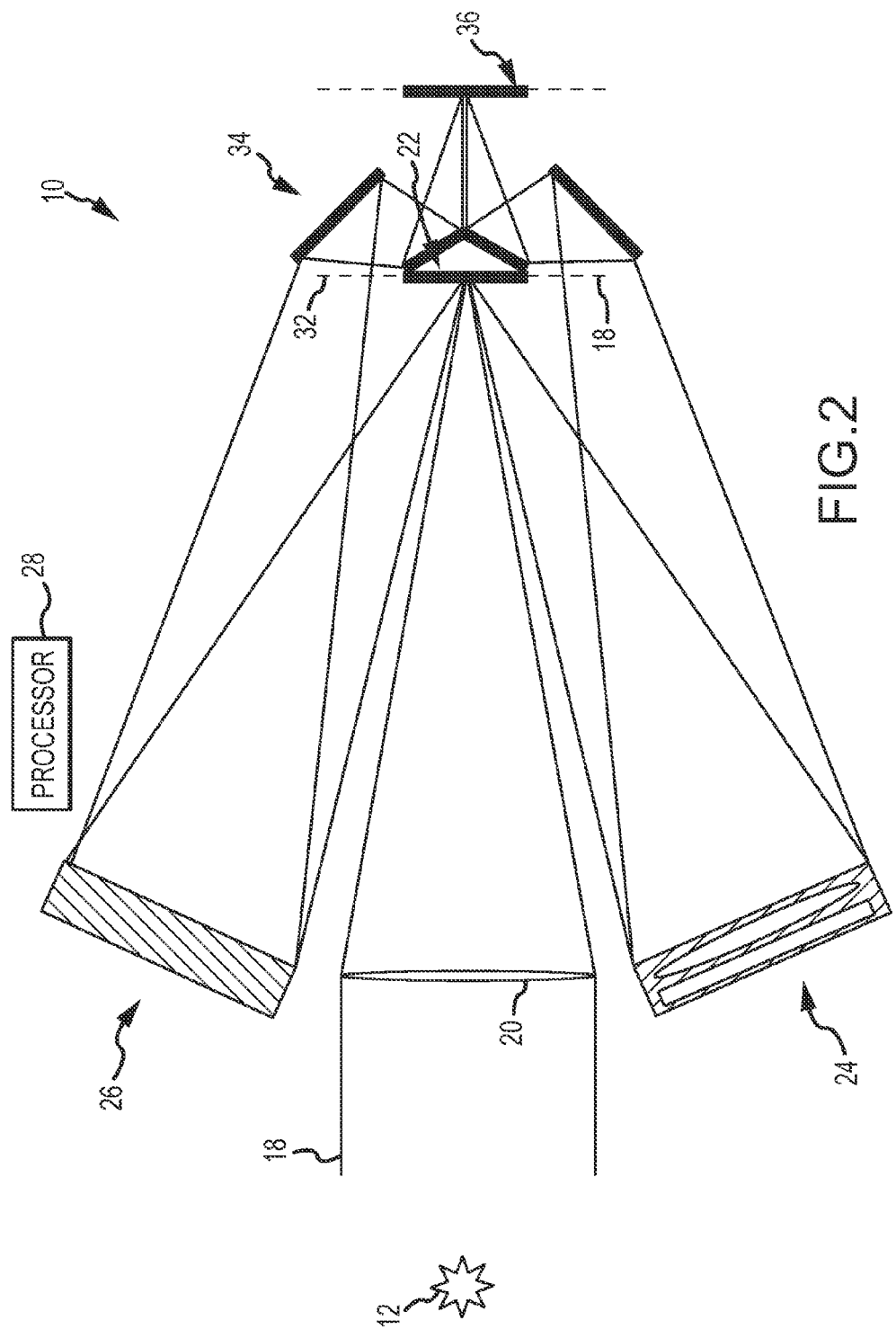
FIG. 2 is a diagram of an embodiment of an EO sensor in which the broadband and multi-filtered channels are folded to share the same detector.

In an embodiment, the primary and multi-filtered optical channels 24 and 26 are independent, each including its own optics and detector. In another embodiment, the primary and multi-filtered optical channels have independent optics but are "folded" to share the same detector. As shown in FIG. 2, the EO sensor comprises folding mirrors 34 that fold the primary optical channel and the multi-filtered optical channel onto the same detector 36. In another embodiment, the primary and multi-filter channels share the same optics and the same detector. In this embodiment, the sub-channels are time multiplexed. To obtain the multi-filtered output, each sub-channel is processed one at a time. To obtain the primary output, at least a plurality and suitably all of the sub-channels are processed simultaneously.

Processor(s) 28 is configured to control light modulator 22 to alternately direct the incident optical radiation in the FOV to a primary optical channel 24 and to a multi-filtered optical channel 26 to time multiplex the FOV. How the FOV is time multiplexed between the primary and multi-filtered optical channel depends on the application (e.g. guided munition or surveillance system), mission requirements (e.g. detection, acquisition, identification, aimpoint selection) and changes to the mission requirements due to changing conditions (e.g. range to target, progression from one mode to the next such as from acquisition to discrimination or from discrimination to terminal).

In general, an EO sensor generates an output at a sensor update rate (e.g. 60 Hz). The sensor update rate defines a theoretical integration period for the detector to generate the output synchronized to the sensor update rate assuming zero processing delay. To accommodate a finite processing delay, the actual maximum integration period is for example 80% of the theoretical.

As shown in FIG. 3a, the light modulator is controlled to direct optical radiation in the FOV to the primary optical channel for a period of time 40. The detector integrates the optical radiation for the maximum integration period 42 and processes the detected radiation to output the first electrical signal at the sensor update rate 44. The light modulator is then controlled to direct optical radiation in the FOV to the multi-filtered optical channel for a period of time 50. The detector integrates the optical radiation for the maximum integration period 52 and processes the detected radiation to output the second electrical signal at the sensor update rate 54. In a guided munition, the optical radiation may be directed to the primary optical channel for detection and tracking when the range-to-target exceeds a certain threshold or the SNR of the detected signal is less than a certain threshold and then switched to the multi-filtered optical channel for discrimination when the range-to-target is less than the certain threshold or the SNR in the primary channel exceeds the certain threshold.

As shown in FIG. 3b, the light modulator is controlled to direct optical radiation in the FOV to the primary optical channel for the maximum integration period 60 during each clock cycle and to direct the optical radiation in the FOV to the multi-filtered optical channel for the unused portion of the integration period 62 during each clock cycle. The detector(s) output the first electrical signal for the primary channel synchronized to the sensor update rate 64 and output the second electrical signal for the multi-filtered channel at a rate 66 equal to the sensor update rate but slightly delayed. This approach may be used to ensure that the primary optical channel receives optical radiation as if the multi-filtered optical channel did not exist. The inclusion of the multi-filtered optical channel does not affect the availability of optical radiation to the primary channel or the SNR of the detected radiation.

As shown in FIG. 3c, the light modulator is controlled to direct optical radiation in the FOV to the primary optical channel for a first integration period 70 during each clock cycle and to direct the optical radiation in the FOV to the multi-filtered optical channel for a second integration period 72 during each clock cycle. The detector(s) suitably output the first electrical signal for the primary optical channel and the second electrical signal for the multi-filtered optical channel at rates 74 and 76, respectively, equal to but not synchronized to the sensor update rate. The first and second portions of the integration period assigned to the primary and multi-filtered channels may vary with mission parameters. For example, the portion assigned to the primary channel may be set to ensure a minimum SNR of the detected signal in the primary channel. As the range between the EO sensor and the target is reduced, the portion of the integration period assigned to the primary channel may be reduced while maintaining the minimum SNR.

Figure 4:
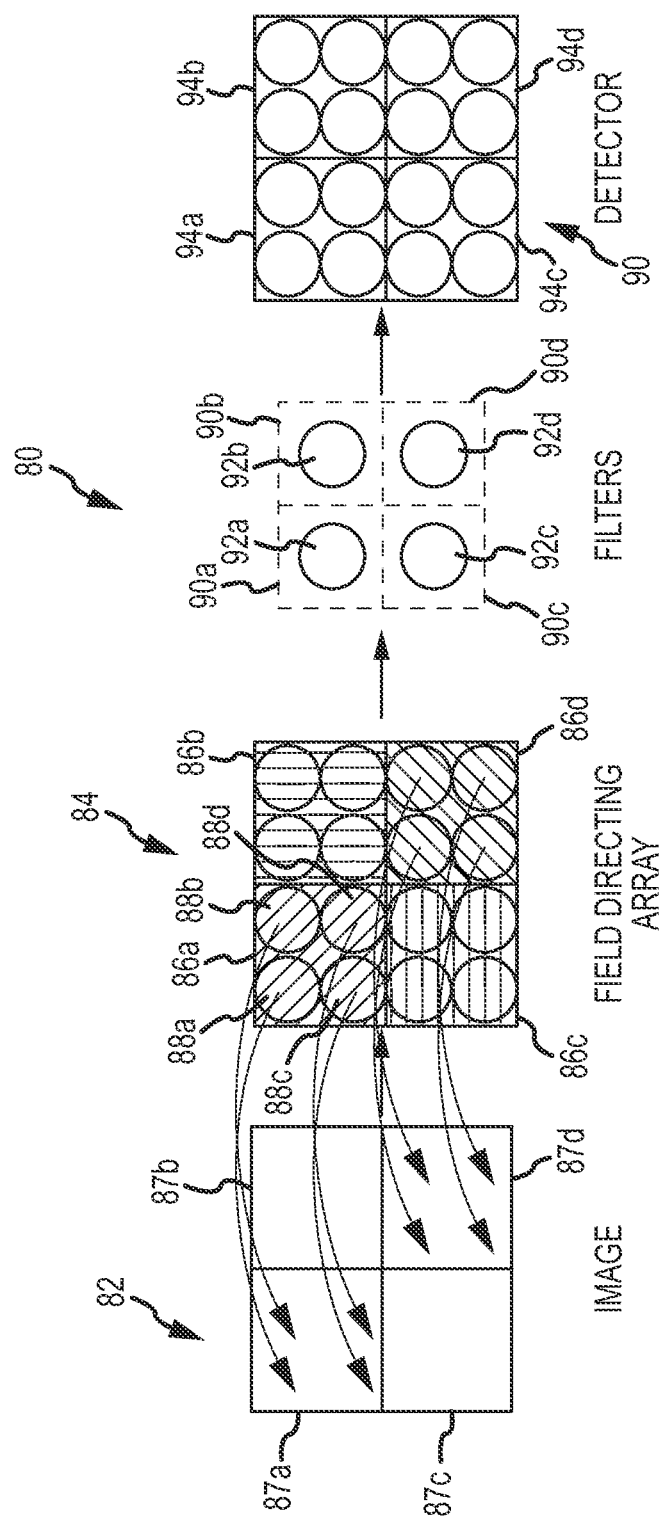
FIGS. 4 and 5 are diagrams of an embodiment of an EO sensor in which the multi-filtered channels are spatially multiplexed onto different sub-regions of the detector.

As shown in FIG. 4, an embodiment of a multi-filtered optical channel 80 relays and collimates an image 82 of the FOV to a field directing array 84. Field directing array 84 comprises a plurality of tilt cells 86a, 86b, 86c and 86d configured to spatially sample the optical radiation of image 82 over the FOV. Each tilt cell 86a, 86b, 86c and 86d maps to a super pixel 87a, 87b, 87c and 87d in image 82. Each tilt cell 86a, 86b, 86c and 86d includes four optical tilt elements 88a, 88b, 88c and 88d that tilt the sampled optical radiation in a super pixel by different tilt angles to map the sampled FOV to spatially separated optical sub-channels 90a, 90b, 90c and 90d. Optical filters 92a, 92b, 92c and 92d having different measurement bands (e.g. different spectral, polarization, amplitude or phase) are positioned in the different sub-channels to filter the optical radiation of the sub-sampled image. The filtered optical radiation is directed to different sub-regions 94a, 94b, 94c and 94d of a detector 96 that converts the incident filtered optical radiation into a second electrical signal. By spatially multiplexing the different sub-channels the second electrical signals for those sub-channels can be read out simultaneously.

Field directing array 84 may, for example, be a diffractive optical component that provides fixed tilt angles (e.g. "optical wedges") or an adaptive optical phased array that can be reconfigured to change the tilt angles. The spatial sampling resolution of the image is dictated by the resolution of the field directing array. For example, a field directing array may have 100×100 tilt cells with each cell including 4 different optical tilt elements. The array would direct a 100×100 sub-sampled image to each of 4 sub-channels for filtering. Each filtered 100×100 image may be directed to a 100×100 sub-region of a 400×400 pixel detector. The resolution of the field directing array and detector do not have to match. If the resolution of the detector is less than the field directing array, portions of the image corresponding to different super pixels will be overlapped onto the same detector pixel. As will be described in reference to FIG. 8, a time demultiplexing process can be implemented to scan the FOV to achieve the native resolution of the field directing array on the lower resolution detector.

Figure 5:
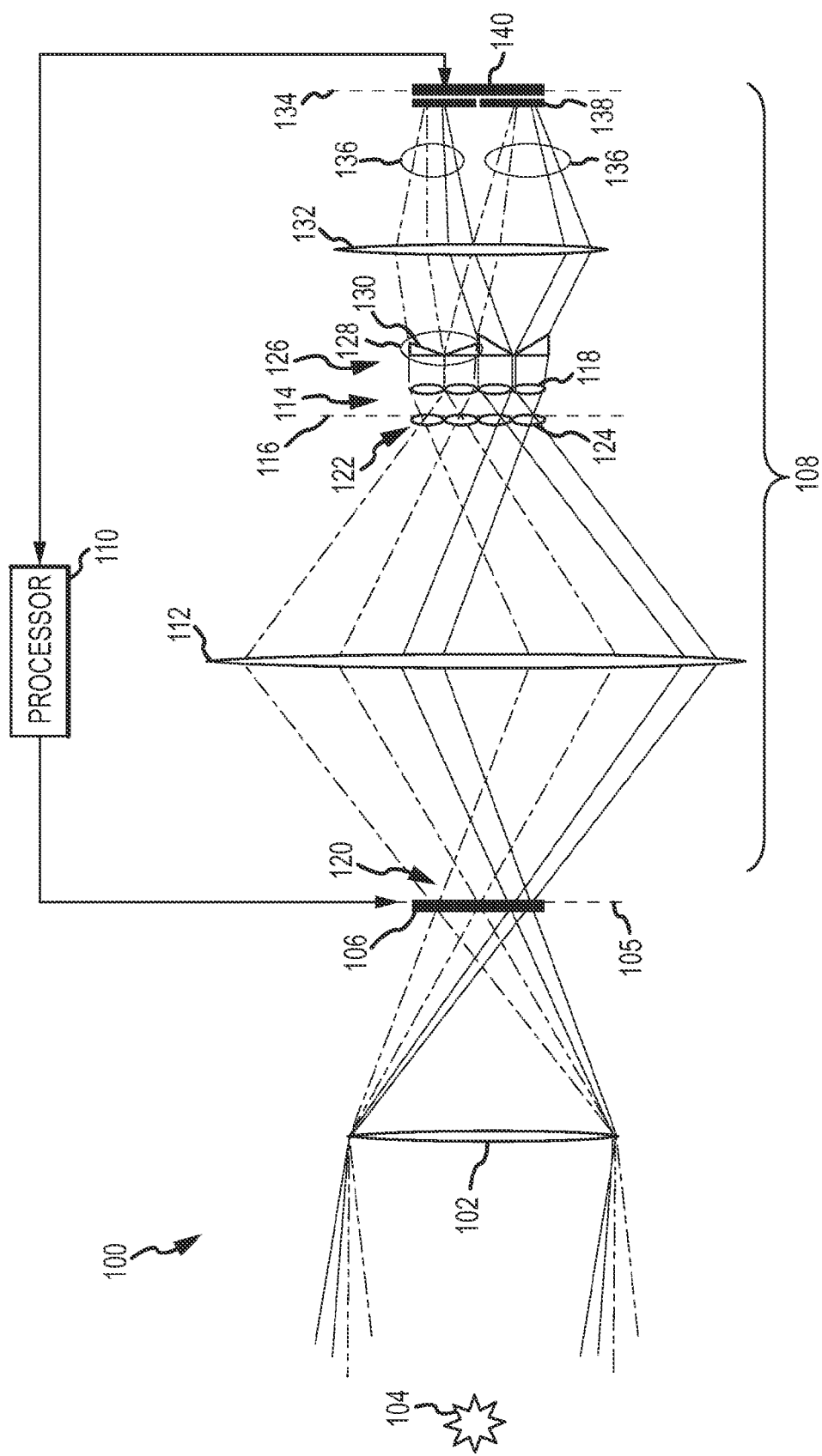

As shown in FIG. 5, an embodiment of an EO sensor 100 includes objective optics 102 that form an image of an object 104 at an image plane 105. A light modulator 106 positioned at or near the image plane alternately directs optical radiation from object 104 in the FOV to a primary optical channel (not shown) and a multi-filtered optical channel 108 to time multiplex the FOV. The light modulator 106 may include a single element to redirect optical radiation between the primary and multi-filtered channels. Alternately, the light modulator 106 may include an array of addressable elements to selectively direct portions of the FOV to either channel. A processor(s) 110 is configured to provide control signals to the light modulator or its addressable elements to direct the optical radiation.

Multi-filtered optical channel 108 comprises relay optics 112 that convert the spatial mapping at image plane 105 to another spatial mapping at another image plane that can be accessed by an optical focusing array 114. The optical focusing array 114 is positioned with its focal plane 116 at or near the reimaged plane. The relay optics 112 may or may not provide magnification. The relay optics are required in a reflective system but may be omitted in a transmissive system.

Optical focusing array 114 (such as a lenslet array) comprises optical focusing elements 118 (e.g. lenslets) that decompose the FOV into a plurality of sub-fields 120, one sub-field per focusing element. With a pixelated light modulator, each sub-field is addressed by one or more addressable elements. Each addressable element is mapped to a different portion of the FOV.

The individual optical focusing elements 118 reduce the angular spread of rays that are incident to the objective optics 102. The focusing elements split the entire FOV into a number of smaller sub-fields 120, acting to "collimate" the ray bundles over a limited range of spatial offsets defined by the focal length and size of the individual focusing elements. In effect, each optical focusing element 118 converts the sub-field spatial mappings at the relayed image plane to an angular mapping.

In order to insure that the individual focusing elements 118 collect as much of the optical radiation as possible, a field correcting optical array 122 is placed close to first image plane 10S or the optically relayed version of this plane to introduce a negligible optical power to the system. The focal length of the individual focusing elements 124 of field correcting optical array 122 should be close to that of the individual optical focusing elements 118 to insure that the entrance pupil of the objective imaging system is imaged onto the array of optical focusing elements 18. This pupil mapping insures that the individual optical focusing elements are able to capture as much of the incident electromagnetic radiation as possible. It should be obvious to a person with basic knowledge in optical design that the two separate functions of the optical focusing array 114 and field correcting optical array 122 might be combined in various forms, but that the basic output of the combined system would be a reduced angular spread of the rays that are incident to the objective optics with a telecentric configuration such that each sub-field would contain a displaced, but identical spread of rays.

A field directing array 126 in the substantially collimated space of the optical focusing array 114 adjusts the angular mapping of each sub-field 120 by tilting the selected optical radiation by a tilt angle. The field directing array 126 comprises a plurality of tilt cells 128 that spatially sample the optical radiation over the FOV. Each tilt cell 128 includes a plurality of optical tilt elements 130 that tilt the sampled optical radiation by different tilt angles (e.g. first, second, third . . . tilt angles). Each tilt element 130 is paired with an optical focusing element 118 to tilt the optical radiation in the associated sub-field. Because each sub-field contains an identical spread of rays, the tilts of the optical elements across the array of tilt cells are uniform e.g. the first tilt in all the cells is the same, the second tilt in all the cell is the same etc. If optical focusing array 114 were replaced with a simple focusing optic the tilts across the field directing array would have to be varied to compensate for the difference in the angular divergence of rays across the focusing optic.

A focusing optic 132 in the substantially collimated space of the field directing array 126 focuses the optical radiation to convert the angular mappings to spatial mappings at a common image plane 134. The different tilt angles associated with the different optical tilt elements in the tilt cells direct the sampled FOV into a plurality of spatially separated optical sub-channels 136 with each sub-channel 136 mapped to a different sub-region at the common image plane. The optical radiation from all of the sub-fields 120 paired with an optical tilt element having a first tilt angle is directed to a first one of the optical sub-channels and so forth.

A filter 138 is positioned in each optical channel 136 to produce filtered optical radiation in each sub-region. The filters 138 have different measurement bands e.g. different spectral bands, different polarizations etc.

A multi-cell imaging detector 140 is positioned at or near the common image plane 134. The magnification of the optical system is set such that the spatial extent of the combined sub-regions maps to the full extent of imaging detector 140. Each detector cell is mapped to a sub-region and comprises at least one pixel element that converts incident optical radiation into an electrical signal that is read out at an integration period determined by processor(s) 110. Each detector cell may be a physically/electrically separate detector such as each one-pixel cell in a quad-cell photodiode or may be an electronically defined sub-region of a single multi-pixel imaging detector. Each pixel element is mapped to one or more tilt cells in the field directing array and one or more elements in the light modulator. The electrical signal is converted to a digital signal that is provided to processor(s) 110 to form one or more images. By spatially multiplexing the different sub-channels into different sub-regions on the detector, the electrical signals for those sub-channels can be read out simultaneously.

Again one skilled in the art will realize that the functions of the field correcting optical array 122, optical focusing array 114, and field directing array 126 might be combined in various forms either for ease of build or economic concerns. However, it is important to be clear that there are three distinct optical functions required:
  (1) Provide maximum transmission of the incident optical radiation through the system (field correcting optical array 122),
  (2) Reduce the angular spread of the signals that are imaged through the objective optics (optical focusing array 114), and
  (3) Control the placement of each sub-field onto the detector (field directing array 126).

Field directing array 126 may be implemented with fixed components such as optical wedges to provide fixed tilt angles or with adaptive components such as an adaptive optical phased array to provide tilt angles that can be changed to reconfigure the optical system. In either case, in a first tilt mode the field directing array 126 is configured to provide at least two different tilt angles so that the focusing optic 132 directs the tilted optical radiation into two spatially separated optical sub-channels that are filtered to form at least two spatially separated sub-regions at the common image plane that are each mapped to a different detector cell. A fixed configuration has only the one first tilt mode. An adaptive configuration will have at least a second and possibly more modes.

Figure 6:
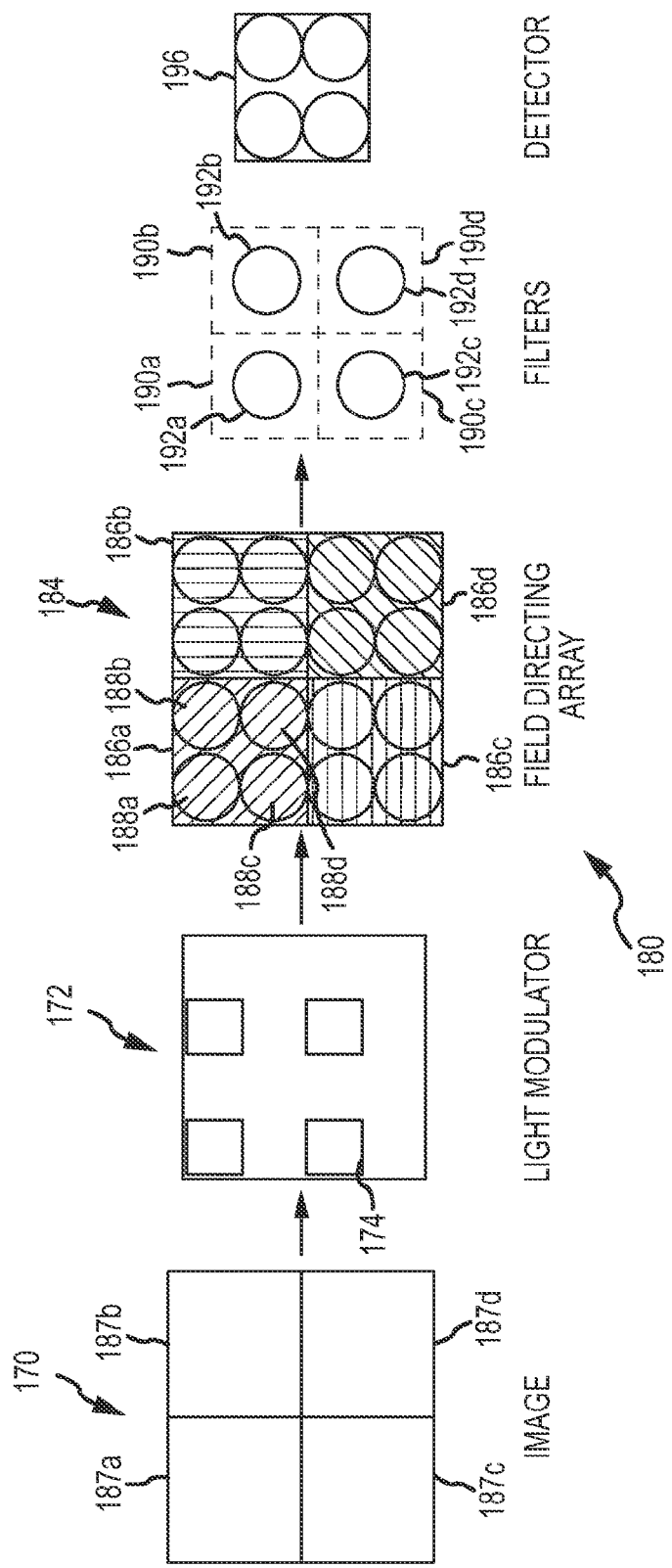
FIGS. 6 and 7 are diagrams of an embodiment of an EO sensor in which the multi-filtered channels are time multiplexed onto the entire detector.

As shown in FIG. 6, in an embodiment of an EO sensor an image 170 within a FOV is formed on a light modulator 172 at or near the image plane. Light modulator 172 comprises an array of addressable elements 174 to independently and selectively direct optical radiation within different portions of the FOV. The light modulator is responsive to control signals to alternately direct the incident optical radiation in the FOV to a primary optical channel (not shown) and to a multi-filtered optical channel 180 to time multiplex the FOV. More particularly to this embodiment, the light modulator is responsive to control signals to alternately direct the incident optical radiation in the FOV to a different filtered optical sub-channel one at a time to time multiplex the FOV to the sub-channels. By time multiplexing the different sub-channels the filtered optical radiation for each sub-channel can be mapped to the entire detector and the second electrical signals for those sub-channels read out serially.

Multi-filtered optical channel 180 relays and collimates image 170 (or selectively addressed portions thereof) of the FOV to a field directing array 184. Field directing array 184 comprises a plurality of tilt cells 186a, 186b, 186c and 186d configured to spatially sample the optical radiation of image 182 over the FOV. Each tilt cell 186a, 186b, 186c and 186d maps to a super pixel 187a, 187b, 187c and 187d in image 170. Each tilt cell 186a, 186b, 186c and 186d includes four optical tilt elements 188, 188b, 188c and 188d that tilt the sampled optical radiation by different tilt angles to map the sampled FOV to spatially separated optical sub-channels 190a, 190b, 190c and 190d. Optical filters 192a, 192b, 192c and 192d having different measurement bands (e.g. different spectral, polarization, amplitude or phase) are positioned in the different sub-channels to filter the optical radiation. The filtered optical radiation is directed to substantially overlap the same region of a detector 196 that converts the incident filtered optical radiation into a second electrical signal.

In this configuration, the processor can configure the addressable light modulator to time multiplex the different filtered in images in a variety of ways. One method might be to serially scan from each filtered image to the next. As shown in FIG. 6, all of the addressable elements in the light modulator corresponding to a first channel are configured to pass the optical radiation whereas all of the remaining addressable elements are configured to block the optical radiation. Consequently, only the first filtered image is directed to the detector. This is then repeated for the second, third and forth channels. Another method might be to combine different filtered sub-channels to reconstruct the filtered signal more efficiently, something akin to compressive sensing. In a "shared" architecture, the primary optical channel may be created by configuring the light modulator to pass all of the filtered images simultaneously. The light modulator may be configured to time multiplex the individual filtered images within each sensor update period by assigning a portion of the integration period allocated to the multi-filtered optical channel to each filtered image. Alternately, the light modulator may be configured to time multiplex the individual filter images across multiple sensor update periods by assigning the entire integration period allocated to the multi-filtered optical channel to a different filtered image over multiple updates.

Figure 7:
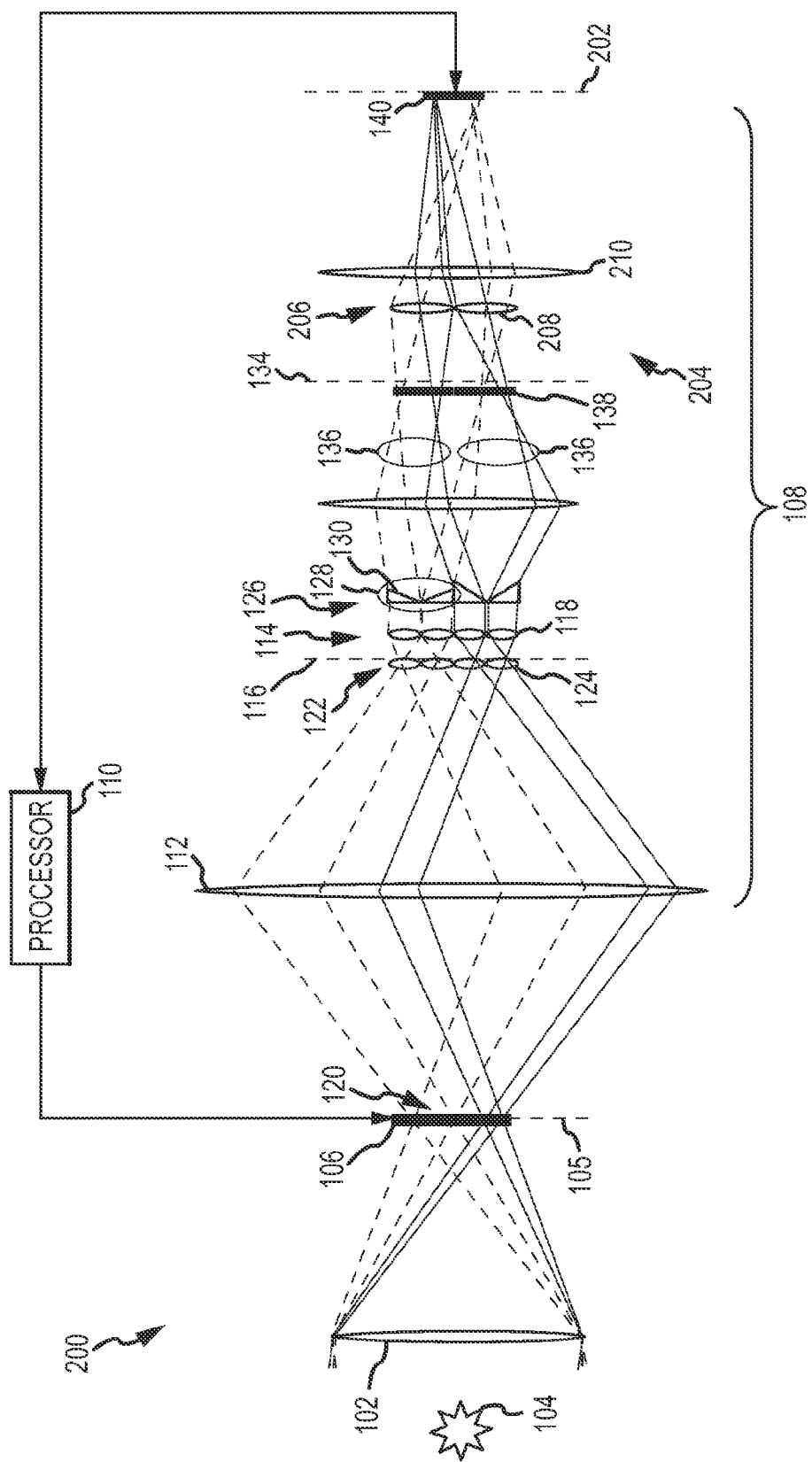

As shown in FIG. 7, an embodiment 200 of the time-multiplexed configuration of the multi-filtered optical channel 180 depicted in FIG. 6 can be a simple extension of the embodiment of the spatially-multiplexed configuration of the multi-filtered optical channel 100 depicted in FIG. 5. In the interest of brevity, the description of the optical system up to the mapping of the different filtered optical sub-channels 136 to different sub-regions at the common image plane 134 is omitted as it is identical to that provided for FIG. 5. Elements in the common portion of the optical system are provided with the same reference numerals.

In the time-multiplexed system of FIG. 7, detector 140 is repositioned at a relayed version 202 of the common image plane. An additional optical system 204 is placed between common image plane 134 and its relayed version 202. Optical system 202 overlaps the different filtered optical sub-channels on the detector 140. In one embodiment, optical system 204 comprises a lenslet array 206 having a number of lenslets 208 equal to the number of optical sub-channels. The lenslets reduce the angular divergence of the ray bundles from the different optical sub-channels such that a focusing optic 210 sees a nearly replicated (but spatially offset) bundle from each optical sub-channel. The focusing optic 210 images these bundles to the same location on the detector.

Figure 8:
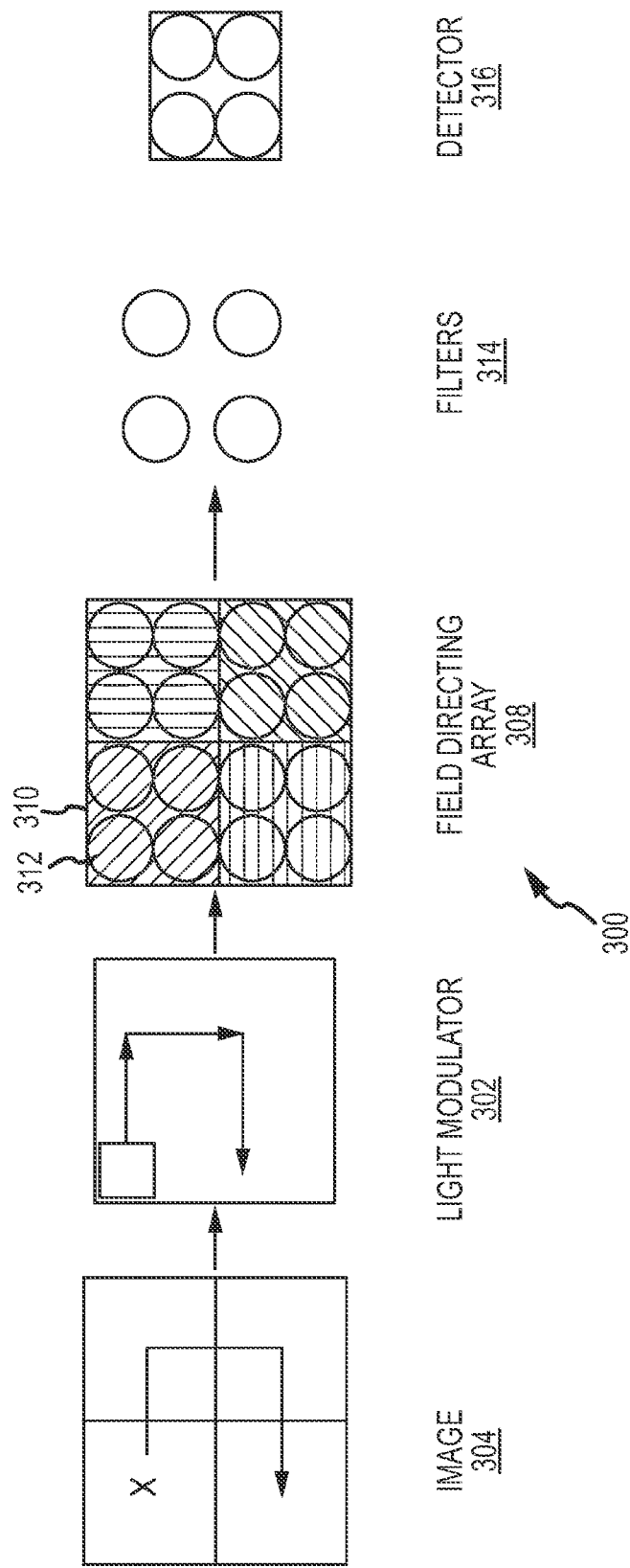
FIG. 8 is a diagram illustrating an embodiment of a digitally scanned EO sensor.

In another embodiment of a multi-filtered channel 300 as shown in FIG. 8, an addressable light modulator 302 is configured to time de-multiplex different portions of the image 304 in the FOV that are spatially overlapped on the same pixel in the detector 306. As previously described, a field directing array 308 includes a plurality of tilt cells 310, each including a plurality of optical tilt elements 312 with different tilt angles, that subsamples image 304 to form sub-sampled replicates of image 304 in different optical sub-channels. A different filter 314 is positioned in each optical sub-channel to filter the replicate image. Depending on whether the channel is configured to spatially or time multiplex the filtered optical sub-channels, the sub-channels are either directed to different sub-regions of the detector 316 or overlapped on the entire detector. The detector is configured to read out the electrical signals over an appropriate integration period to stitch together an image whose spatial resolution exceeds the resolution of the detector. This de-multiplexing may be applied to some, all or none of the sub-channels based on mission requirements for SNR or spatial resolution.

In general, de-multiplexing allows the EO sensor to construct high-resolution images with less expensive lower resolution detectors. De-multiplexing may also allow the EO sensor to achieve high spatial sub-sampling resolution of the FOV using a lower resolution field directing array. De-multiplexing may be applied to one or more of the optical sub-channels while the remaining sub-channels are not de-multiplexed. A more detailed explanation of this time de-multiplexing method is provided in co-pending application U.S. Ser. No. 13/768,778 entitled "Digitally Scanned Multi-Cell Electro-Optic Sensor" filed Feb. 15, 2013, which is hereby incorporated by reference.

Case 1:

Assume a 20×20 pixel detector that is divided into 4 10×10 sub-regions to detect 4 filtered sub-channels. Consider a field directing array having 100×φtilt cells with each cell including four optical tilt elements. A light modulator has 400×400 addressable elements. Each light modulator element is mapped to a single optical tilt element. 10×10 optical tilt elements, hence 10×10 portions of the FOV are mapped to and overlap each detector pixel. The light modulator is addressed to serial scan each addressable element, hence each optical tilt element in a 10×10 block to map a single portion of the FOV onto a given detector pixel during an integration period. By stitching the electrical signals together the 20×20 pixel detector can produce 100×100 pixel images for each of the four filtered sub-channels.

Case 2:

Assume a 20×20 pixel detector that is divided into 4 10×10 sub-regions to detect 4 filtered sub-channels. Consider a field directing array having 50×50 tilt cells with each cell including four optical tilt elements. A light modulator has 400×400 addressable elements such that 10×10 portions of the FOV are mapped to and overlap each detector pixel. A 2×2 block of addressable elements is mapped to each optical tilt element and in turn 5×5 blocks of tilt elements are mapped to and overlap each detector pixel. The light modulator is addressed to serial scan each addressable element in the 2×2 blocks mapped to each optical tilt element and the 5×5 blocks of optical tilt elements to map a single portion of the FOV onto a given detector pixel during an integration period. By stitching the electrical signals together the 20×20 pixel detector can produce 100×100 pixel images for each of the four filtered sub-channels.

Comparing Cases 1 and 2, the time required to scan the full filtered sub-image is clearly less in case 1. This has the advantage that motion artifacts due to scanning are reduced, however it is at the cost of a more precise and expensive field directing array.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An electro-optic (EO) sensor, comprising
   an objective optical system that forms an image within a field of view (FOV) from incident optical radiation;
   a light modulator configured to alternately direct the incident optical radiation in the FOV to a primary optical channel and to a multi-filtered optical channel to time multiplex the FOV;
   said primary optical channel comprising a relay optic configured to relay the image of the FOV onto a detector configured to convert optical radiation into a first electrical signal;
   said multi-filtered optical channel comprising,
      a focusing optic configured to collimate the incident optical radiation in the FOV;
      a field directing having a plurality of tilt cells configured to spatially sample the optical radiation over the FOV, each tilt cell comprising first and second optical tilt elements that tilt the sampled optical radiation by different first and second tilt angles, respectively, to map the sampled FOV to first and second spatially separated optical sub-channels;
      first and second optical filters positioned in said first and second spatially separated optical sub-channels, respectively, to filter the optical radiation, said first and second optical filters having different measurement bands; and
      one or more detectors that convert the filtered incident optical radiation in the different measurement bands into a second electrical signal.

2. The EO sensor of claim 1, further comprising:
   a processor configured to control the light modulator to direct the incident optical radiation in the FOV to the primary optical channel when a range to target is greater than a threshold and to the multi-filtered optical channel when the range to target is less than the threshold.

3. The EO sensor of claim 1, wherein the sensor has a sensor update rate corresponding to an integration period, further comprising:
   a processor configured to control the light modulator to direct the incident optical radiation the FOV to the primary optical channel for a fixed portion of the integration period such that the detector outputs the first electrical signal at the sensor update rate at the end of each integration period and to the multi-filtered optical channel for the unused portion of the integration period such that the detector outputs the second electrical signal at the sensor update rate with a fixed delay from the end of each integration period.

4. The EO sensor of claim 1, wherein the sensor has a sensor update rate corresponding to an integration period, further comprising:
   a processor configured to control the light modulator to direct the incident optical radiation to the FOV to the primary optical channel for a first portion of the integration period and to the multi-filtered optical channel for a second portion of the integration period.

5. The EO sensor of claim 4, wherein the processor varies the first portion of the integration period to maintain a minimum signal to noise ratio (SNR) in the primary optical channel.

6. The EO sensor of claim 1, wherein the primary optical channel includes either no filter or a single band filter.

7. The EO sensor of claim 1, further comprising folding mirrors that fold the primary optical channel and the multi-filtered optical channel onto the same detector.

8. The EO sensor of claim 1, wherein the multi-filtered optical channel directs the filtered optical radiation in the first and second optical sub-channels onto different first and second sub-regions of the detector.

9. The EO sensor of claim 1, wherein the multi-filtered optical channel overlaps the filtered optical radiation in the first and second spatially separated optical sub-channels onto the detector, wherein said light modulator comprises an array of addressable elements to independently and selectively direct optical radiation with different portions of the FOV to the first and second optical tilt elements in said tilt cells, said light modulator responsive to a control signal to time multiplex the filtered optical radiation in the first and second spatially separated optical sub-channels.

10. The EO sensor of claim 9, wherein said primary optical channel and said multi-filtered optical channel form a shared optical channel, wherein said light modulator is responsive to a control signal to simultaneously overlap the optical radiation in the first and second optical sub-channels to output the first electrical signal.

11. The EO sensor of claim 1, wherein the first and second optical filters comprise one of different spectral bands, different polarizations, different amplitudes or different phases.

12. The EO sensor of claim 1, wherein the focusing optic comprises an optical focusing array comprising an optical focusing element for each of said first and second optical tilt elements in each of said tilt cells in the field directing array, wherein said first and second tilt angles are substantially uniform across the field directing array.

13. The EO sensor of claim 1, wherein said first and second optical tilt elements are fixed.

14. The EO sensor of claim 1, wherein said field directing array is reconfigurable to provide different first and second tilt angles.

15. The EO sensor of claim 1, wherein in said multi-filtered optical channel different portions of the FOV that map to different tilt cells overlap at the detector, wherein said light modulator comprises an array of addressable elements to independently and selectively direct optical radiation within different portions of the FOV to the first and second optical tilt elements in said tilt cells, further comprising:
   a processor configured to generate control signals for the addressable elements corresponding to at least one of the first and second optical sub-channels to pass optical radiation for a different one of said tilt cells in a time sequence to time de-multiplex the spatially overlapping portions of the FOV at the detector, each said detector pixel detecting only the optical radiation from the one selected portion of the FOV at a given time.

16. An electro-optic (EO) sensor, comprising
an objective optical system that forms an image within a field of view (FOV) from incident optical radiation;
a spatial light modulator comprising an array of addressable elements to independently and selectively direct optical radiation within different portions of the FOV, said spatial light modulator responsive to control signals to alternately direct the incident optical radiation in the FOV to a primary optical channel and to a multi-filtered optical channel to time multiplex the FOV;
said primary optical channel comprising a relay optic configured to relay the image of the FOV onto a detector configured to convert optical radiation into a first electrical signal;
said multi-filtered optical channel comprising,
   a focusing optic configured to collimate the incident optical radiation in the FOV;
   a field directing array having a plurality of tilt cells configured to spatially sample the optical radiation over the FOV, each tilt cell comprising first and second optical tilt elements that tilt the sampled optical radiation by different first and second tilt angles, respectively, to map the sampled FOV to first and second spatially separated optical sub-channels, wherein said first and second optical tilt elements in each said tilt cell map to a different addressable element in said spatial light modulator;
   first and second optical filters positioned in said first and second optical sub-channels, respectively, to filter the optical radiation, said first and second optical filters having different measurement bands;
   wherein different portions of the FOV that map to different tilt cells spatially overlap at a common image plane;
   a pixelated detector positioned at or near the common image plane, said detector configured to convert the filtered incident optical radiation in the different measurement bands into a second electrical signal; and
   a processor configured to generate control signals for the addressable elements corresponding to at least one of the first and second optical sub-channels to pass optical radiation for a different one of said tilt cells in a time sequence to time de-multiplex the spatially overlapping portions of the FOV at the detector, each said detector pixel detecting only the optical radiation from the one selected portion of the FOV at a given time.

17. An electro-optic (EO) sensor, comprising
an objective optical system that forms an image within a field of view (FOV) from incident optical radiation;
a focusing optic configured to collimate the incident optical radiation in the FOV;
a field directing array having a plurality of tilt cells configured to spatially sample the optical radiation over the FOV, each tilt cell comprising first and second optical tilt elements that tilt the sampled optical radiation by different first and second tilt angles, respectively, to map the sampled FOV to first and second spatially separated optical sub-channels;
first and second optical filters positioned in said first and second optical sub-channels, respectively, to filter the optical radiation, said first and second optical filters having different measurement bands; and
one or more detectors that convert the filtered incident optical radiation in the different measurement bands into an electrical signal.

18. The EO sensor of claim 17, wherein different portions of the FOV that map to different tilt cells overlap at the detector, wherein said light modulator comprises an array of addressable elements to independently and selectively direct optical radiation within different portions of the FOV to the first and second optical tilt elements in said tilt cells, further comprising:
   a processor configured to generate control signals for the addressable elements corresponding to at least one of the first and second optical sub-channels to pass optical radiation for a different one of said tilt cells in a time sequence to time de-multiplex the spatially overlapping portions of the FOV at the detector, each said detector pixel detecting only the optical radiation from the one selected portion of the FOV at a given time.

19. The EO sensor of claim 17, wherein the filtered optical radiation in the first and second optical sub-channels is directed onto different first and second sub-regions of the detector.

20. The EO sensor of claim 17, wherein the filtered optical radiation in the first and second spatially separated optical sub-channels is spatially overlapped onto the detector, wherein said light modulator comprises an array of addressable elements to independently and selectively direct optical radiation with different portions of the FOV to the first and second optical tilt elements in said tilt cells, said light modulator responsive to a control signal to time multiplex the filtered optical radiation in the first and second spatially separated optical sub-channels.

* * * * *